United States Patent [19]

Taylor

[11] Patent Number: 5,720,123
[45] Date of Patent: Feb. 24, 1998

[54] DEPTH IMAGE OBJECT/PICTURE FRAME

[75] Inventor: Roy Y. Taylor, Scottsville, N.Y.

[73] Assignee: Eastman Kodak Company, Rochester, N.Y.

[21] Appl. No.: 649,921

[22] Filed: May 16, 1996

Related U.S. Application Data

[63] Continuation of Ser. No. 174,079, Dec. 28, 1993, abandoned.

[51] Int. Cl.⁶ .................................................. G03B 25/02
[52] U.S. Cl. .............................. 40/454; 40/427; 40/768; 40/798; 359/455; 359/619; 362/135
[58] Field of Search .............................. 40/427, 437, 454, 40/768, 800, 798, 453; 359/454, 455, 459, 619, 620, 622; 362/32, 135, 327

[56] References Cited

U.S. PATENT DOCUMENTS

| | | | |
|---|---|---|---|
| D. 137,475 | 3/1944 | Morehead | 40/798 X |
| 1,032,515 | 7/1912 | Sterrick | 40/798 X |
| 1,190,498 | 7/1916 | Wiliams | 362/327 |
| 1,202,589 | 10/1916 | Roosman | 40/158.1 X |
| 1,786,033 | 12/1930 | Smith | 362/135 X |
| 1,867,051 | 7/1932 | Bareis . | |
| 2,514,814 | 7/1950 | Towne . | |
| 2,917,854 | 12/1959 | Swarbrick . | |
| 3,225,457 | 12/1965 | Schure . | |
| 3,268,238 | 8/1966 | Finkel . | |
| 3,314,179 | 4/1967 | Leach | 40/454 X |
| 3,357,773 | 12/1967 | Rowland . | |
| 3,423,865 | 1/1969 | Hardesty et al. | 40/454 |
| 3,538,632 | 11/1970 | Anderson | 40/427 |
| 3,562,941 | 2/1971 | Boden . | |
| 4,255,380 | 3/1981 | Bjorkland | 40/453 X |
| 4,804,253 | 2/1989 | Stewart . | |
| 4,920,039 | 4/1990 | Fotland | 359/619 X |
| 4,922,384 | 5/1990 | Torrence | 40/219 X |
| 4,959,641 | 9/1990 | Bass et al. . | |
| 4,967,499 | 11/1990 | Rosenberg | 40/160 X |
| 5,072,532 | 12/1991 | Kelly | 40/798 X |
| 5,101,436 | 3/1992 | DeAguiar et al. . | |
| 5,113,213 | 5/1992 | Sandor et al. . | |
| 5,259,136 | 11/1993 | Goserud | 40/158.1 X |

FOREIGN PATENT DOCUMENTS 520 179  12/1992  European Pat. Off. .
93/13699  7/1993  WIPO .

OTHER PUBLICATIONS

Proceedings of the IEEE, vol. 68, No. 5, May 1980, "Three–Dimensional Displays" Okoshi pp. 548–564.

Primary Examiner—Anthony Knight
Assistant Examiner—Andrea Chop
Attorney, Agent, or Firm—J. Randall Beckers

[57] ABSTRACT

A frame that includes a depth image lenticular photograph as the frame surrounding a planar print or object of interest to the viewer. The frame can be a reflection print or a backlit transparency of a real object or a graphical creation.

7 Claims, 5 Drawing Sheets

DEPTH IMAGE OBJECT/PICTURE FRAME

This is a Continuation of application Ser. No. 08/174,079, filed Dec. 28,1993 now abandoned.

CROSS REFERENCE TO RELATED APPLICATION

This application is related to U.S. application having Ser. No. 07/885,706 entitled Method And Apparatus For Graphically Generating Images Of Arbitrary Size and U.S. Pat. No. 5,455,689 entitled Electronically Interpolated Integral Photography System both incorporated by reference herein.

BACKGROUND OF THE INVENTION

1. Field of the Invention

The present invention is directed to a picture or object frame that provides a depth image to the viewer and, more particularly, to a frame that allows a user to surround a picture or an object with a lenticular image that appears to have depth allowing frames of arbitrary appearance to be provided to a viewer while maintaining the flat actual physical configuration of the frame.

2. Description of the Related Art

Traditional picture frames include flat surrounding frames as well as carved and sometimes ornate frames that have actual physical depth. The typical frame found in a home is of the flat variety with some of these frames being provided with some three dimensional characteristics in the form of bevelling or molding. Frames that include three dimensional features, such as carved relief images or carved ornamentation, are prohibitively expensive for the home. In addition, some types of frame ornamentation such as color images that have the appearance of being scenes from the outdoors are impossible to carve into a picture frame. What is needed is a frame that allows a stereo image to surround the picture or object in the frame.

SUMMARY OF THE INVENTION

It is an object of the present invention to provide a frame that is flat in physical construction but which has a sense of depth when looked upon by a viewer.

It is another object of the present invention to provide a flat picture frame that can provide a user with the appearance of an expensive carved frame without the cost of actually carving a frame.

It is also an object of the present invention to provide a flat picture frame that provides a sense of depth and that can be easily changed.

It is a further object of the present invention to provide a frame that is light in weight, compact in physical dimension and easily portable.

The above objects can be attained by providing a picture or object frame that includes a lenticular photograph as part of the frame. The frame can be a reflection print or a backlit transparency. The lenticular picture can be a picture of a real object or it can be a graphical creation of the designers imagination. The depth image can produce the impression that the object of the frame is behind the picture held by the frame, that the object is parallel to the frame or in front of the frame.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is a frame for an object or picture where the frame is constructed using a depth image, such as a lenticular image or barrier strip image. A picture frame or object frame is a mechanical device used to display planar images or objects while providing physical protection, mounting features to retain the image or object, and other members to support the assemblage in its intended viewing location. The use of lenticular images in the construction of a display frame increases viewer attraction to the display over conventional frames and can be used with autostereoscopic images to simulate actual physical frame materials or scenes, and computer-generated image effects causing the frame to look different or animated as the viewer changes position relative to the display.

Figure 1:
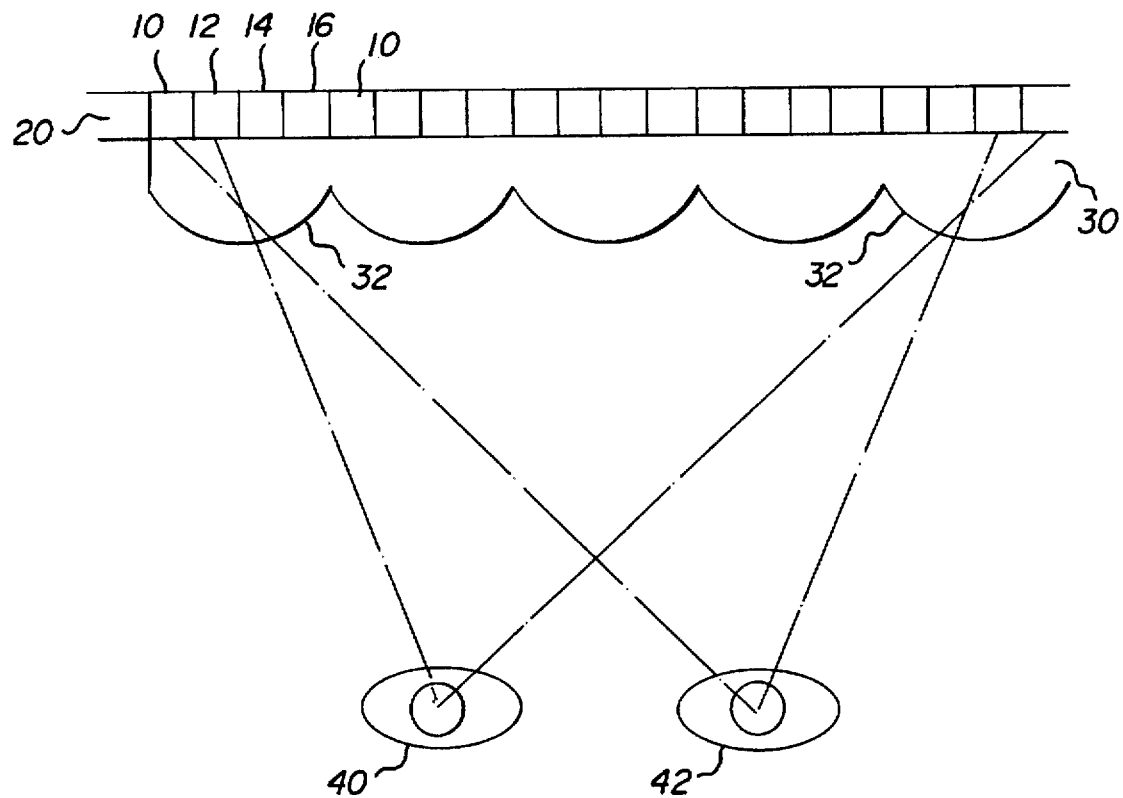
FIG. 1 illustrates the components of a lenticular photograph.

A lenticular image or picture is created by capturing or creating a series of images of a scene or object from different viewpoints. Slices or strips 10, 12, 14 and 16 of each viewpoint image are interleaved and imaged onto a substrate 20, such as a film transparency media, as illustrated in FIG. 1. A lenticular faceplate 30 is attached to the substrate 20. The faceplate 30 includes lenticules 32 which are cylindrical lenses generally oriented with the long axis running in the vertical direction of the image. Each lenticule projects a different one of the slices to the eyes 40 and 42 of a viewer. The viewer merges the slices into a integral image that provides a sense of depth because each eye sees a different one of the viewpoint scenes. The lenticular photograph can be a reflection print or a backlit film transparency. In barrier strip images horizontal image separation is provided through raster occlusion, such as a Ronchi ruling on a faceplate.

Figure 2:
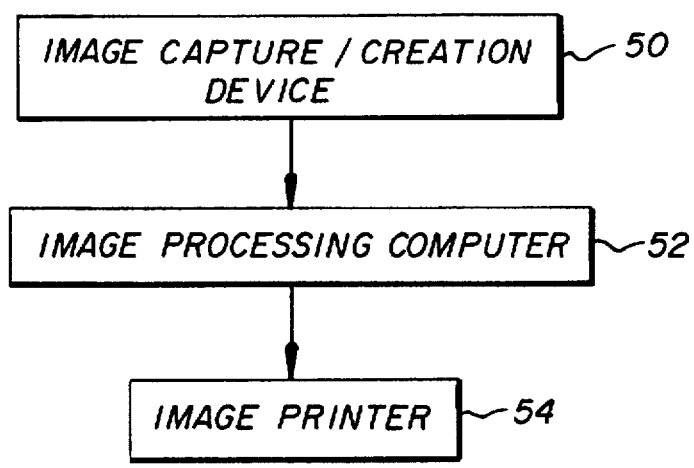
FIG. 2 illustrates the components of a system used to make lenticular pictures that can be converted into frames.

Lenticular images or pictures are created, as previously discussed by capturing or graphically creating a series of images using a conventional depth image capture or creation device 50, as illustrated in FIG. 2. The images of the object or scene from the different viewpoints are provided to a conventional image processing computer 52 which interleaves the slices of the images to create a lenticular image that is provided to a conventional image printer 54. A lenticular faceplate is then laminated to the media. The details of the capturing or creating of images which are used to produce lenticular photographs are described in detail in the related applications previously mentioned.

Figure 3:
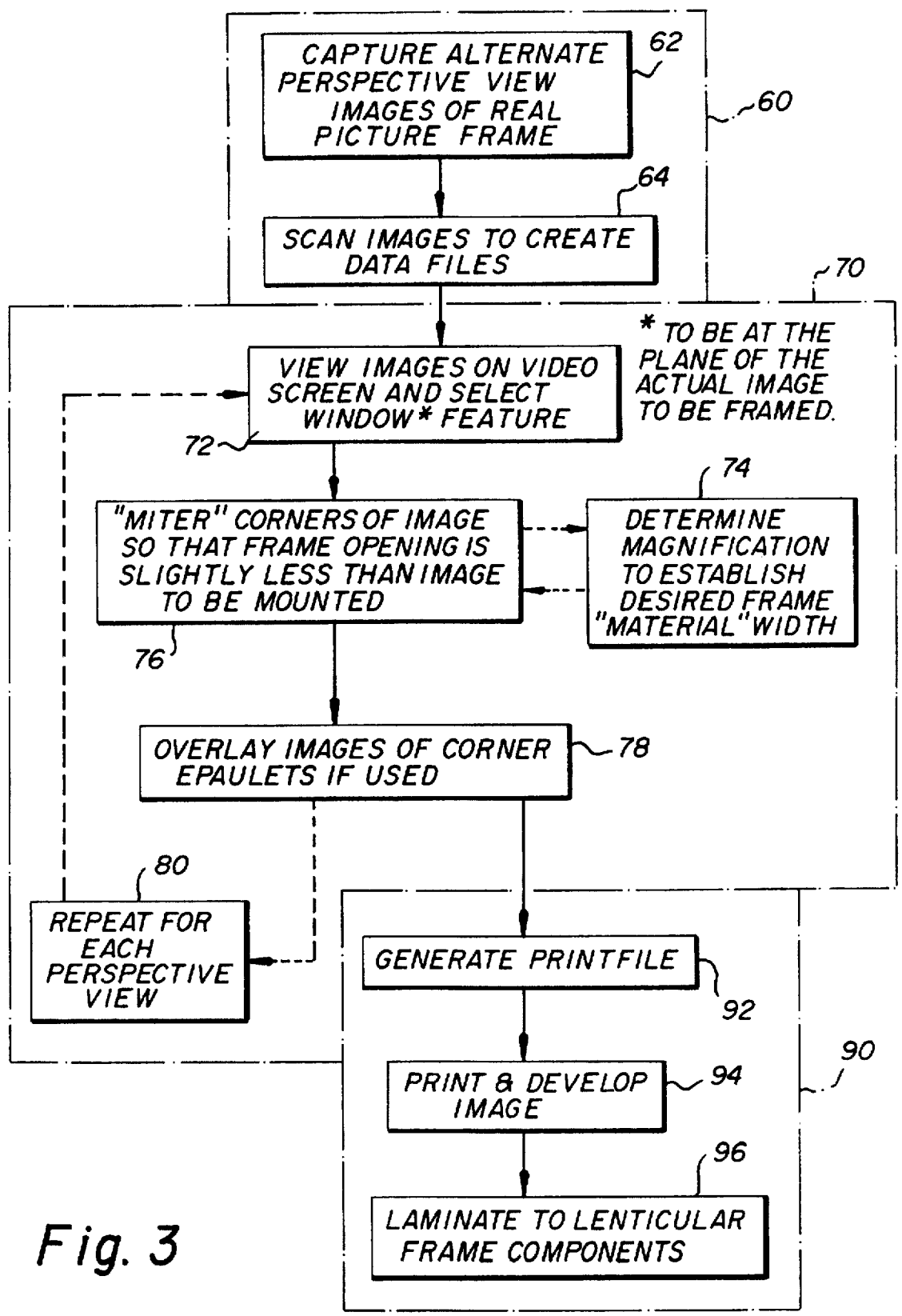
FIG. 3 depicts a procedure for creating lenticular picture frames.

FIG. 3 illustrates a generalized procedure for producing a lenticular picture frame which includes three main procedures: image input 60, image manipulation 70, and lenticular image generation and output 90.

Image input 60 involves capturing 62 the images of the scene from the different viewpoints using conventional depth image capture techniques and scanning 64 the captured images to create conventional depth image data files. For example, a specific photographic series of an actual ornate gold-leafed picture frame can be captured and scanned so that it can be used to generate a depth image of the frame. By cutting a rectangular hole in the depth image, a place could be provided to mount a standard planar photograph or substrate. Such an actual frame is typically approximately 24", by 30" and a picture to be mounted typically is 4" by 6".

While it is possible to optically reduce the actual frame image, so that the resultant inside dimensions would coincide with the picture, this reduction would also reduce the size of the features on the frame. For example, when the actual width of the frame material is 3 inches and it is optically reduced by a magnification of 0.2222× to produce a 4"×6" picture aperture, the result is a frame material image width of 0.66", which appears much too narrow for the desired picture. Moreover, while the 18" inside actual frame dimension results in an image width of 4", the 24" dimension becomes 5.33", which does not match the 6" dimension of the photograph to be mounted. In effect, what is needed is to process the images to magnify (or reduce) the images by an amount sufficient to convert the actual frame width to a desired frame image width, and then "cut" the frame image to a desired frame size. To do this the image manipulation or transformation procedure 70 of FIG. 3 is used.

The Kodak Premier System Image manipulation program available from Eastman Kodak Co., is a convenient image utility to perform the image transformations 70 because it works in the three primary colors simultaneously. However, the individual cyan, magenta, and yellow images can be worked on independently using the PhotoShop program marketed by Adobe Systems Inc. of 1585 Charleston Road, Mountain View, Calif. on a Macintosh Quadra computer and achieve the same end result by additional replications of the procedure. It is necessary to consistently make the same magnification and image dissection changes on each of the perspective views to be used in generating the depth image and to carefully select 72 a common image feature appearing in all the views as a "reference" point visible in each of the perspective views. If it is desired to make the frame features protrude in front of the lenticular faceplate, the reference point can be some physical feature on the actual frame appearing near the back surface of the frame. If the frame image is to appear at the same distance as the planar picture in the frame, a point midway between the back surface and the front surface is selected. Likewise if the frame image is to appear behind the planar picture a point on the front surface is chosen. This reference point is assigned the same line value in each of the perspective view images using conventional depth image windowing techniques prior to construction of the print file. Each of the view images will be scaled 74 by a common amount sufficient to make the output frame material image width become the desired thickness. This is followed by identifying 76 image dissection cut lines at 45 degrees to the sides of the frame to size the image segment to the desired inside frame image dimension. It is important to orient these dissection cut lines to features visible in each of the perspective views. The remaining image segments following dissection cuts are then moved to recontact each other at the dissection lines, much as a carpenter would miter and join the corners on actual frame material when making a physical picture frame. If the picture frame corners include epaulets, these images can be dissected and reassembled by cutting and pasting, overlaying or merging 78 the epaulet images in exact pixel registration to the corners. The overlaying process 78 causes the epaulet features to replace the frame features to the extent of the dissection mask used to isolate the epaulet. This procedure is repeated 80 on each of the perspective views to be used in generating the print file with exact reference to pixel locations being the most precise in terms of consistency, although images of physical features can be used if pixel readout from the photo image display is not available in the image manipulation program.

Once the images have been appropriately manipulated into an image of a frame that is the correct size, the steps necessary to produce 90 the lenticular image are performed. This involves generating 92 a print file and using the print file to drive a printer to expose an appropriate media which is then developed 94. After printing, the image can be directly laminated 96 to a sheet of lenticular faceplate material of appropriate spatial pitch and thickness and physically cut to remove lenticular material and image in the center region where the actual photograph is to be mounted.

Figure 4:
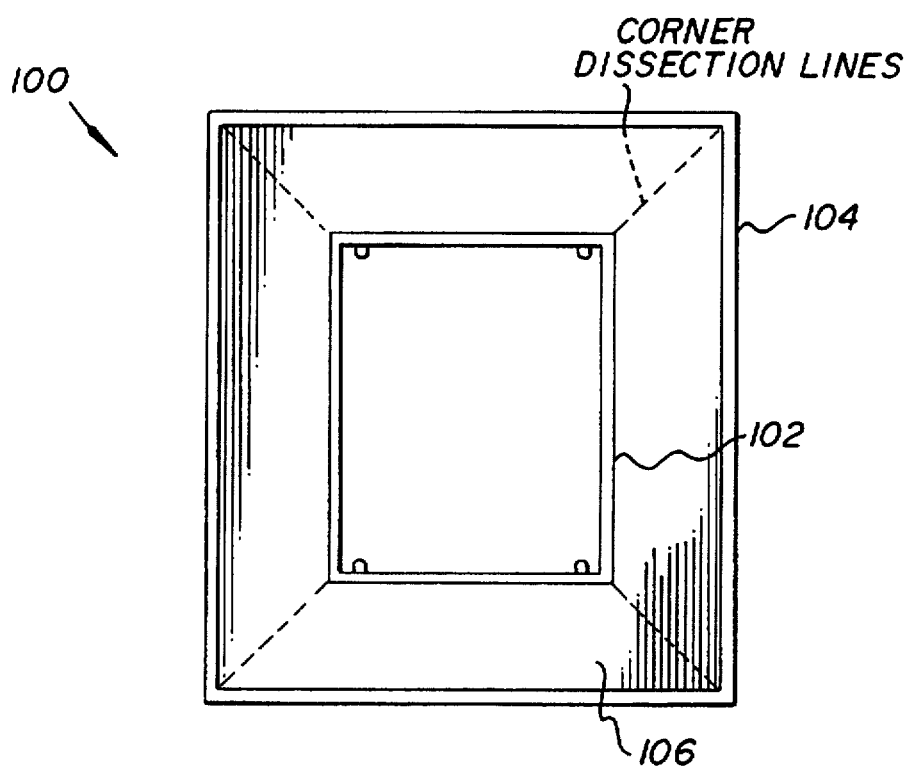
FIG. 4 is a front view of a picture frame according to the present invention.
Figure 5:
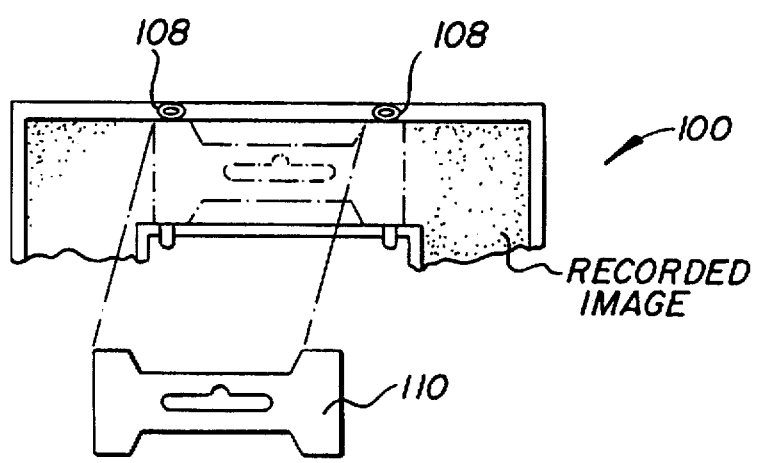
FIG. 5 is a rear view of a portion of the frame.

The components of a picture frame 100 into which the lenticular image of a frame is incorporated includes conventional inner 102 and outer 104 bezels which surround the lenticular picture 106, as depicted in FIG. 4. The picture 106 and bezels 102 and 104 can be held together by one or more conventional clip retainers 108 as illustrated in FIG. 5. A conventional hanger clip 110 can also be provided.

Figure 6:
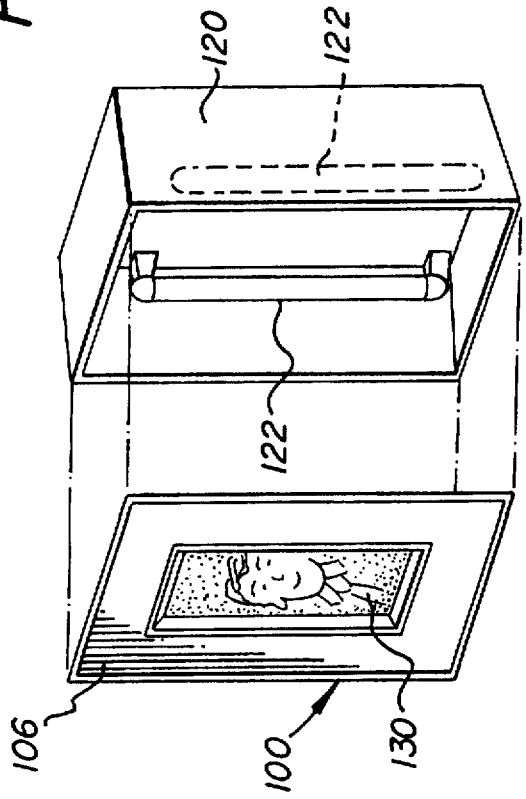
FIG. 6 illustrates a light box embodiment.

The frame 100 can be a conventional reflection print frame or can be incorporated into a backlit transparency frame. A light box 120 for a backlit transparency is shown in FIG. 6. The light box 120 includes conventional lights 122 and is attached to the frame 100 using conventional light box opaque glass attachments. The planar image 130 in such a light box embodiment can be either a transparency or a reflection print.

Figure 7:
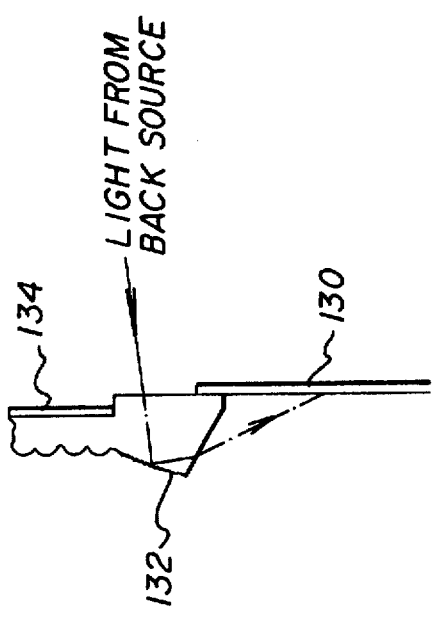
FIG. 7 illustrates reflection planar print embodiment.

To enhance the visual quality of a reflection print used as the planar image 130 an illumination apparatus as illustrated in FIG. 7 can be used. In this embodiment a reflective face 132 is positioned in between the lenticular image 134 and the print image 130. The reflective surface reflects light from the light box onto the print image 130.

If replication of the same picture frame is anticipated, the lenticular faceplate and cutout can be a part of mold design for compression or injection-molded plastic with added features on the backside to physically orient the recorded print file image to the lenticules. Since the lenticular print can be either of the reflection print or transmission variety, means for backlighting the frame area, as discussed above, is necessary. In this event, it is also possible to mold the angled reflecting and refracting surface 132 adjacent to the inside bezel 102 of the frame as shown in FIG. 7 to illuminate the front face of a reflection-type planar print mounted in a transmission-type lenticular frame.

While the immediate appeal of the invention is to utilize the lenticular display for an autosterescopic image to be used as a picture frame, it should also be recognized that the print file can be constructed from actual pictures or computer files to create an animated effect. If the object or scene includes slight movements between the different perspectives, these images will not substantially destroy the stereoscopic effect of the frame and the frame will appear to be moving when viewed from slightly different perspectives. This same effect could be used to cause color patches to shift on the surface of an object in a logical sequence so that a barber pole image in the frame, for instance, would appear both in depth and moving.

As has already been utilized on baseball trading cards, in conjunction with lenticular faceplates as produced by Optigraphics Inc. of Dallas, Tex., the images viewed from different perspectives can be entirely different planar views, not intended to invoke stereopsis in the viewer. The orientation of the lenticules in this case do not need to extend in a vertical direction, but could be angled at any direction relative to the vertical. The lenticules do not need to be straight, but can be curled as spirals or wavy parallel patterns, or zig zags which cause direction-sensitive Moire patterns to be generated. One such example is shown in FIG. 8 where curved lenticules 140 are combined with straight line image printing 142 to produce different patterns 144 and 146 from different viewpoints. These non-straight and non-vertical lenticules can be combined with straight and vertical lenticules at different zones of the frame to allow both autostereoscopic and direction sensitive Moire patterns to be present on the same frame.

When graphics modeling processes, such as described in the related application previously mentioned, are used to create the image of a frame, the graphics process allows the designer to create an arbitrarily shaped object as the frame. The surface of this object can be texturized with artificial as well as photographic images, colored with arbitrary colors and the frame can be artificially lit from an arbitrary direction. This allows the imagination of the frame designer to roam freely within the entire graphics field in searching for imaginative frames.

This invention also encompasses frames which have no cutout whatever for a planar image, but are continuous sheets only intended for autosterescopic and/or direction-sensitive Moire pattern displays.

Figure 9:
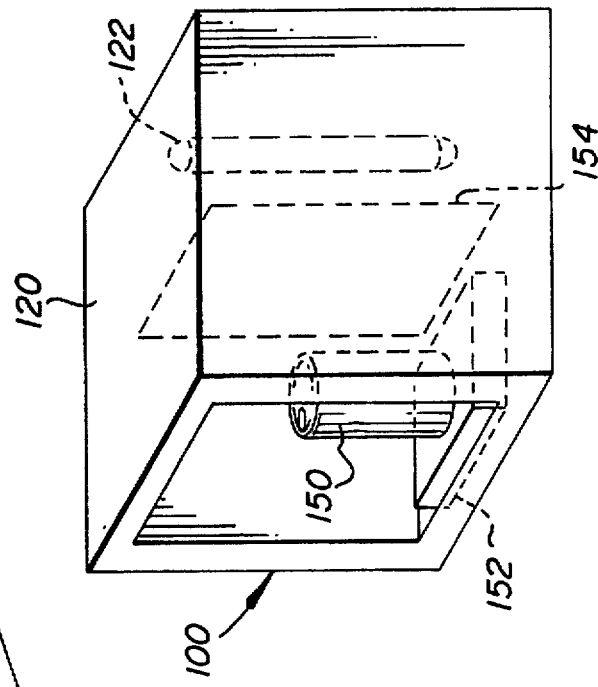
FIG. 9 depicts a real object being surrounded by the frame.
Figure 8A:
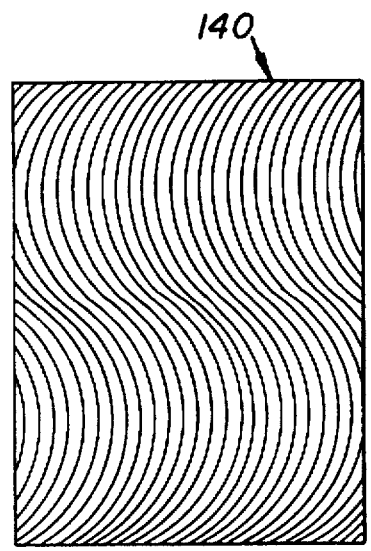
FIGS. 8a–8d shows patterns created using non-straight lenticules.
Figure 8B:
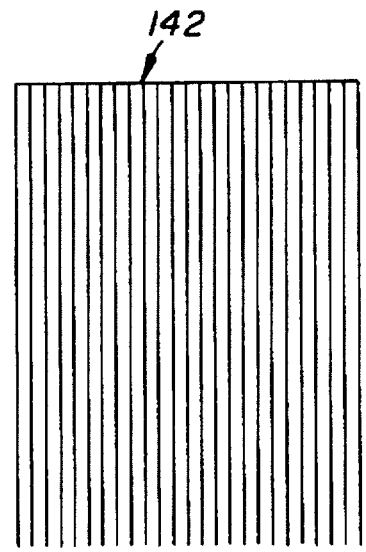
Figure 8C:
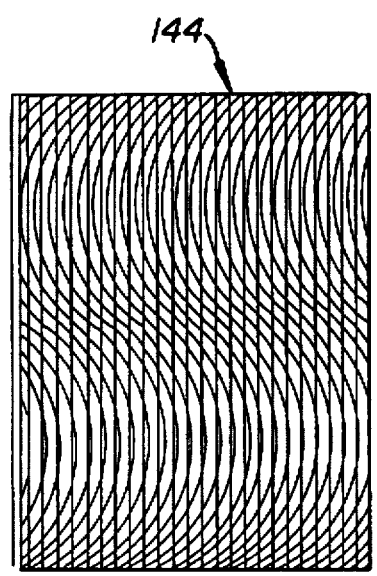
Figure 8D:
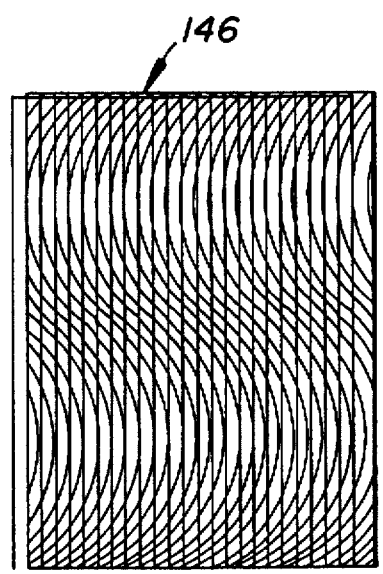

Instead of positioning a planar picture in the frame it is possible to place an real object 150, such as a beverage container or a family heirloom, in the frame 100 such that the object rests on a platform 152 in the light box 120 as illustrated in FIG. 9. A background lenticular image 194, in a situation where a real object is positioned relative to the frame image, can extend behind the real object allowing the background 154 and frame 100 lenticular images to create not only the surround for the real object but also the background. Such a background image 154 can be mounted in the light box 120 behind the object 150 between the lights 122 and the object 150. By adjusting the depth image reference windows of the frame 100 and background 154 images, as previously discussed, the present invention can make the real object appear as if it is located in an environment that is impossible in the circumstances. For example, a frame sitting in a living room and that surrounds the object can project an image of the mouth of an icy cave extending in front of the object while the background can produce an interior cave image. By providing an appropriate reflecting surface, such as surface 132, the object 150 can also be illuminated.

It is also possible for the real object to be positioned in front of a lenticular image with portions of the image projecting in front of the object and other portions appearing as if the were at some distance behind the object in effect being a backdrop to the object being framed or presented.

The present invention has been described with respect to the picture in the frame being a planar image. It is of course possible for the picture in the frame to be a depth image.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List 10,12,14,16 Image slices
20 Image substrate
30 Lenticular faceplate
32 Lenticules
40 Eyes
50 Image capture/creation device
52 Image processing computer
54 Image printer
60 Image input
62 Image capture
64 Image scanning
70 Image manipulation
72 Image windowing
74 Image corner matching
76 Image magnification
78 Image overlay
80 Repeat
90 Lenticular image creation
92 Print file generation
94 Image printing and development
96 Lamination
100 Frame
102,104 Bezel
106 Lenticular image faceplate
108 Retainers
110 Hanger
120 Light box
122 Lights
130 Planer image
132 Reflective surface
134 Lenticular image
140 Curved lenticules
142 Image printing
144 Image view 1
146 Image view 2
150 Object
152 Platform
154 Background image

What is claimed is:

1. A picture apparatus, comprising:
   a planar image substrate comprising a reflection print;
   a depth image substrate including a depth image comprising a lenticular substrate and a transparency, and positioned adjacent to and surrounding said planar image substrate as a frame;
   a light box attached to said transparency and projecting light through said transparency; and
   a reflective surface reflecting light from said light box onto said print.

2. An apparatus as recited in claim 1, wherein scenic image elements of the depth image comprise one of an actual scene or a graphical scene.

3. A picture apparatus, comprising:
   a planar image substrate;

a frame attached to and surrounding said planar image substrate, said frame comprising:

an inner bezel attached to and surrounding the planar image substrate;

a lenticular depth image substrate including a lenticular faceplate and an image transparency on a rear of said faceplate, including planar perspective dependent scenic image elements, and positioned adjacent to and surrounding said inner bezel; and an outer bezel attached to and surrounding said depth image substrate; and a light box attached to said outer bezel and projecting light through said depth image transparency.

4. A picture apparatus, comprising:

a planar image substrate comprising a reflection print;

a frame attached to and surrounding said planar image substrate, said frame comprising:

an inner bezel attached to and surrounding the planar image substrate;

a lenticular depth image substrate including a depth image transparency and positioned adjacent to and surrounding said inner bezel; and an outer bezel attached to and surrounding said depth image substrate;

a light box attached to said outer bezel and projecting light through said depth image transparency and a reflective surface attached to said inner bezel and to said depth image substrate and reflecting light from said light box onto said print.

5. An apparatus as recited in claim 4, wherein scenic image elements of the depth image comprise one of an actual scene or a graphical scene.

6. An apparatus for displaying, comprising:

an object being displayed; and a depth image frame including a depth image having a lenticular faceplate with planar perspective dependent scenic image elements on a rear of said faceplate and positioned associated with and surrounding said object;

the apparatus further comprising a background depth image positioned behind the object as a backdrop.

7. An apparatus as recited in claim 6, further comprising a light box attached to said frame and surrounding the object and said background depth image.

* * * * *